United States Patent [19]

Hallam et al.

[11] Patent Number: 4,598,981
[45] Date of Patent: Jul. 8, 1986

[54] WIDE-ANGLE FLAT FIELD TELESCOPE

[75] Inventors: Kenneth L. Hallam, Washington, D.C.; Barton J. Howell, College Park; Mark E. Wilson, Greenbelt, both of Md.

[73] Assignee: The United States of America as represented by the Administrator of the National Aeronautics and Space Administration, Washington, D.C.

[21] Appl. No.: 698,641

[22] Filed: Feb. 5, 1985

[51] Int. Cl.⁴ .................. G02B 17/06; G03B 11/04
[52] U.S. Cl. ........................... 350/505; 350/276 R; 354/479; 358/222
[58] Field of Search .............. 350/505, 504, 620, 619, 350/276 R; 354/479; 358/222

[56] References Cited

U.S. PATENT DOCUMENTS

| 3,432,219 | 3/1969 | Shenker et al. | 350/504 |
| 3,811,749 | 5/1974 | Abel | 350/504 |
| 3,907,401 | 9/1975 | Liu | 350/1.3 |
| 3,963,328 | 6/1976 | Abel | 350/504 |
| 4,101,195 | 7/1978 | Korsch | 350/505 |
| 4,265,510 | 5/1981 | Cook | 350/620 |

FOREIGN PATENT DOCUMENTS 478546 12/1983 U.S.S.R. ........................ 350/620

OTHER PUBLICATIONS

Dietrich Korsch, "Design . . . Three-Mirror Telescopes", App. Opt., vol. 19, No. 21, pp. 3640-3640, Nov. 1980.
Rubin Gelles, "Unobscured . . . Telescopes", Opt. Eng., vol. 13, Nov.-Dec. 1974, pp. 534-538.
W. B. King, "Unobscured . . . Mirrors", App. Opt., vol. 13, pp. 21-22, Jan. 1974.

Primary Examiner—Jon W. Henry
Attorney, Agent, or Firm—John O. Tresansky; John R. Manning

[57] ABSTRACT

An unobscured three mirror wide-angle telescopic imaging system comprised of an input baffle which provides a 20° (Y axis)×30° (X axis) field of view, a primary mirror having a convex spherical surface, a secondary mirror having a concave ellipsoidal reflecting surface, a tertiary mirror having a concave spherical reflecting surface. The mirrors comprise mirror elements which are offset segments of parent mirrors whose axes and vertices commonly lie on the system's optical axis. An iris diaphragm forming an aperture stop is located between the secondary and tertiary mirror with its center also being coincident with the optical axis and being further located at the beam waist of input light beams reflected from the primary and secondary mirror surfaces. At the system focus following the tertiary mirror is located a flat detector which may be, for example, a TV imaging tube or a photographic film. When desirable, a spectral transmission filter is placed in front of the detector in close proximity thereto.

17 Claims, 5 Drawing Figures

WIDE-ANGLE FLAT FIELD TELESCOPE

ORIGIN OF THE INVENTION

The invention described herein was made by employees of the United States Government and may be manufactured and used by or for the Government for governmental purposes without the payment of any royalties thereon or therefor.

TECHNICAL FIELD

This invention relates generally to optical apparatus and more particularly to a wide-angle all-reflective unobscured telescopic imaging system.

BACKGROUND ART

There are numerous known types of optical systems employing mirrors for obtaining wide fields of view for use, typically in telescopes, examples of which include the Schmidt system which is configured from a combination of both refractive and reflective elements and the Schwarzschild system which is formed with both concentric and flat field forms. Other types of reflective three mirror and four mirror systems are also well known; however, they provide less than adequate imaging properties over a planar focal surface for certain applications. The best known performing two mirror telescope is the aplanatic Cassegrain system which is corrected for spherical aberration and coma, but exhibits considerable astigmatism as well as curvature of field which is typically limited to 1° in diameter. The addition of a third mirror makes it possible to correct more third order aberrations, but usually there still exists a field of view which is less than 10° in diameter, and the same central obscuration that is characteristic of two mirror systems. All refractive multielement systems avoid the problem of obscuration and may provide a relatively large field of view but are nevertheless severely limited in the spectral range of operation. The spectral range that can be covered is made almost limitless by using all reflective elements; however, this normally introduces obscurations which degrade optical performance by introducing vignetting of the images, and by the reduction in spatial resolution due to additional diffraction.

STATEMENT OF THE INVENTION

Accordingly, it is an object of this invention to provide an improvement in optical imaging systems.

It is a further object of this invention to provide a wide-angle all-reflective imaging system.

It is another object of this invention to provide a wide-angle unobscured optical system for producing images on flat detectors.

Still another object of this invention is to provide a wide-angle all reflective unobscured optical system which is operable over a broad range of the electromagnetic spectrum in the region from far ultraviolet to infrared, including the visible portion of the spectrum.

It is yet another object of this invention to provide an all-reflective optical system of relatively low focal ratio providing a flat unvignetted image of a distant and relatively faint scene.

Still a further object of this invention is to provide an all-reflective imaging system for producing images on detectors such as photographic film, vidicons or other photoelectric image detection devices.

Briefly, the foregoing and other objects are achieved by a system comprised of a segment of a convex spherical first or primary mirror, a segment of a concave ellipsoidal secondary mirror and a segment of a concave spherical tertiary mirror, with a well defined aperture stop located between the secondary and tertiary mirror segments. The mirror segments are included within a housing and have off centered apertures to provide an unobscured beam; however, the centers or axes of the parent spheres of the primary and tertiary mirror segments as well as the foci of the secondary parent ellipsoid all lie on a common optical axis which also passes through the center of the aperture stop. A wide-angled (20°×30°) input baffle assembly is mounted on the housing and directs input beams of light to the mirror segments which are offset from the system axis in a first direction but are in line therewith in the transverse direction so that beams of light entering the system through the baffle axially traverse a zig-zag path through the offset mirror segments to a flat detector without being obscured by any of the mirror elements.

The foregoing as well as other objects, features and advantages of the invention will become apparent from the following detailed description when taken in conjunction with the accompanying drawings.

DETAILED DESCRIPTION OF THE INVENTION

Although this invention is not meant to be specifically limited as to use, it nevertheless has particular applicability for astronomical and earth telescopic observations from a space vehicle, whether it be a space shuttle vehicle or satellite. Accordingly, such missions dictate the necessity for a wide-angled system which can provide ultraviolet through infrared wave coverage and yet tolerate the environment encountered in outer space. Moreover, the celestial sky observed in the infrared or vacuum ultraviolet spectral regions of the electromagnetic spectrum differs considerably in appearance, in brightness, and in variability of its component objects compared to the more familiar and extensively observed visual scenes on earth. In the visible wavelength region, the well known Harvard Sky Patrol Program has provided astronomers with valuable archival records of the entire sky and made repeatedly over many decades with photographic cameras. These have been used, for example, to determine the onset of novae, outbursts, to measure the variability of numerous stars, to discover extra galactic supernovae and even to track the past history of quasar variability. Furthermore, with the aid of electronic image detection and recording technology, the observed data can be made quickly and easily with the net result of more comprehensive and usable data being obtainable. With the advent of regular space shuttle missions, a telescopic camera system in accordance with the invention now to be described, can provide useful and otherwise unobtainable information.

Figure 1:
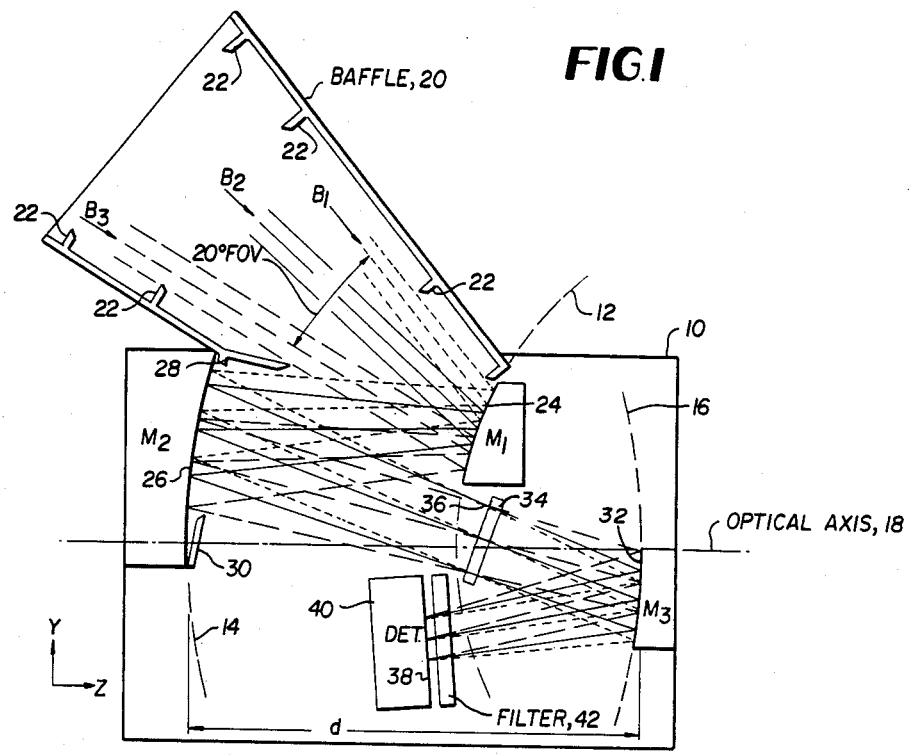
FIG. 1 is a side plan view generally illustrative of the preferred embodiment of the invention.

Referring now to the drawings and more particularly to FIG. 1, shown thereat is a central longitudinal section of a side plan view of the preferred embodiment of the invention including, among other things, a box-like housing which is designated by reference numeral 10. The purpose of the housing 10 is to provide a mounting structure and a light tight compartment for a spherical primary mirror $M_1$, an ellipsoidal secondary mirror $M_2$, a spherical tertiary mirror $M_3$, all having off-centered apertures. The three mirrors $M_1$, $M_2$ and $M_3$ comprise segments of reference surfaces represented by dashed lines 12, 14 and 16, respectively. The centers of the reference spheres of the primary and tertiary mirror elements 12 and 16 including the mirror segments $M_1$ and $M_3$ as well as the foci of the secondary reference ellipsoid mirror surface 14 including the mirror segment $M_2$, all lie along, i.e. are coincident with a common optical axis 18. While the three mirror segments $M_1$, $M_2$ and $M_3$ are displaced in the vertical or Y axis as shown in FIG. 1, they are centered on Y-Z plane including their common optical axis 18 along the Z axis as shown in FIG. 2.

Figure 2:
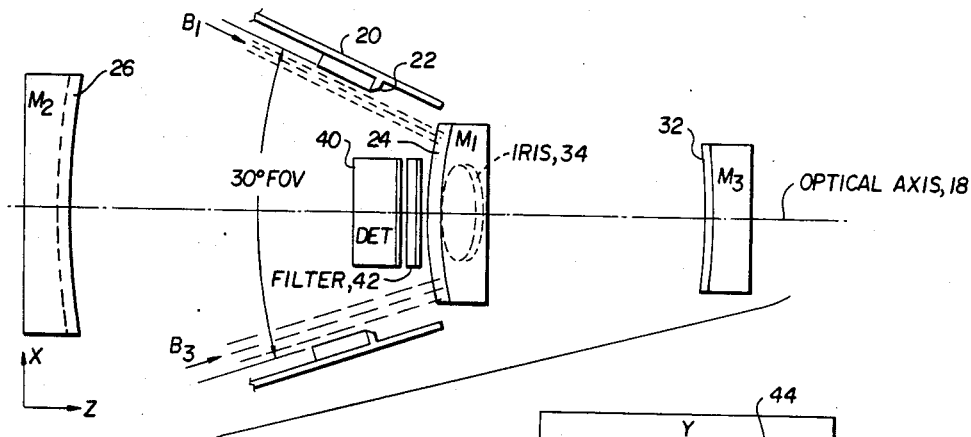
FIG. 2 is a top plan view generally illustrative of the embodiment of the invention shown in FIG. 1.

In addition to the two spherical mirror segments $M_1$ and $M_3$, as well as the ellipsoidal mirror segment $M_2$, the housing 10 includes an input baffle 20 having a generally rectangular cross section for delimiting a relatively wide field of view (20° in the Y axis direction and 30° in the X axis direction) as shown in FIGS. 1 and 2. The baffle assembly, moreover, includes a plurality of inner projecting members 22 for not only limiting the field of view, but also for eliminating inner surface reflections of input beams of light, three of which are shown as $B_1$, $B_2$ and $B_3$, with $B_2$ being the center-most beam. The input beams $B_1$, $B_2$ and $B_3$ are directed to the convex spherical reflecting surface 24 of the primary spherical mirror segment $M_1$. The reflected beams from the surface 24 are directed to the concave ellipsoidal reflecting surface 26 of the secondary mirror segment $M_2$. Further, as shown in FIG. 1, the input baffle 20 includes an inner projecting element 28 and another substantially flat baffle element 30 is secured to the secondary mirror segment $M_2$ for providing an aperture mask for the beams $B_1$, $B_2$ and $B_3$ impinging on and reflected from the ellipsoidal mirror surface 26.

The light beams reflected from the concave ellipsoidal surface 26 of the secondary mirror segment $M_2$ are directed to the concave spherical reflecting surface 32 of the tertiary spherical mirror segment $M_3$. Additionally, an aperture stop in the form of an iris diaphragm 34 is located intermediate the secondary mirror segment $M_2$ and the tertiary mirror segment $M_3$ at the beam waist region 36 of the beams $B_1$, $B_2$ and $B_3$. The center of the aperture stop 34, moreover, is coincident with the optical axis 18 and is operable to provide a focal ratio of between f/4 and f/22. The reflected light beams from the concave spherical surface 32 of the tertiary mirror segment $M_3$ converge at a planar focal surface 38 where there is located a flat detector 40, which may be, for example, a TV imaging device such as a vidicon tube or CCD array. When desirable, other types of photoelectronic imaging detecting devices may be utilized. Also the detector 40 may take the form of a photographic film. Although not essential for its operation, the embodiment of the invention as shown in FIGS. 1 and 2 also includes an optical filter 42 placed directly in front of the detector 40 and is intended to limit the spectral range to a predetermined region of the electromagnetic spectrum, even though it is possible to utilize all or part of the radiation spectrum over a very broad range of wave length from far infrared through vacuum ultraviolet due to the sole use of reflective components. When desirable, the filter 42 may be alternatively placed behind the aperture stop 34. Additionally, the spectral range of the system can be predetermined by the selection of the spectral characteristic of the detector used and the spectral reflectivity of the mirror surfaces 24, 26 and 32.

Thus as beams of light traverse a zig-zag path through the offset mirror segments $M_1$, $M_2$ and $M_3$, none of the rays that pass through the aperture stop provided by the iris diaphragm 34 are obscured by any of the mirror segments $M_1$, $M_2$ and $M_3$.

The system is corrected for spherical aberration by balancing the contribution of the secondary mirror segment $M_2$ with that of the third tertiary mirror segment $M_3$, leaving the small residual of the first mirror segment $M_1$. Coma is corrected by balancing the contributions of the first and third mirror segments $M_1$ and $M_3$ with that of the second mirror segment $M_2$. Astigmatism is corrected by balancing the contributions of the first and third mirror segments $M_1$ and $M_3$, leaving the small residual of the second mirror segment $M_2$. The curvature of the three mirror segments $M_1$, $M_2$ and $M_3$ are designed to provide a zero Petzval sum.

Where, for example, the reference surfaces 26 and 32 of the secondary mirror segment $M_2$ and of the tertiary mirror segment $M_3$ have a mutual separation d along the optical axis 18 of, for example, 13 centimeters, the following parameters set forth in Table I are capable of providing a design having an effective focal length of substantially 36 millimeters and an f/4 focal ratio.

TABLE I

| FIRST ORDER SYSTEM | | | | |
|---|---|---|---|---|
| EFL | F/NBR | | | |
| −37.754 mm. | −4.02 | | | |
| SEMI-FIELD OF VIEW | | APERTURE STOP DIAMETER | | |
| 10° × 15° | | 2.0 cm. | | |

| | | BASIC LENS DATA (cm) | | |
|---|---|---|---|---|
| SURFACE | CURVATURE | RADIUS | SEPARATION | MEDIUM |
| 0 | 0.000000 | 0.000000 | INFINITE | AIR - OBJECT |
| 1 | 0.000000 | 0.000000 | 0.000000 | AIR ⎫ |
| 2 | 0.000000 | 0.000000 | 0.000000 | AIR ⎪ |
| 3 | 0.000000 | 0.000000 | 16.403878 | AIR ⎬ BAFFLE 20 |
| 4 | 0.000000 | 0.000000 | 0.000000 | AIR ⎪ |
| 5 | 0.000000 | 0.000000 | 0.000000 | AIR ⎭ |
| 6 | 0.000000 | 0.000000 | −4.499900 | AIR |
| 7 | 0.111111 | 9.000000 | −7.690554 | PRI.MIRROR 12 |

TABLE I-continued

| | | | | |
|---|---|---|---|---|
| 8 | 0.055556 | 18.000000 | 7.690554 | SEC.MIRROR 14 |
| 9 | 0.111111 | 9.000000 | 1.000000 | AIR |
| 10 | 0.000000 | 0.000000 | 0.000000 | APER.STOP 34 |
| 11 | 0.000000 | 0.000000 | 4.436948 | AIR |
| 12 | −0.055556 | −18.000000 | −5.968700 | TERTIARY MIRROR - 16 |
| 13 | 0.000000 | 0.000000 | −0.300000 | FILTER - 42 |
| 14 | 0.000000 | 0.000000 | −0.100000 | AIR |
| 15 | 0.000000 | 0.000000 | 0.000000 | DETECTOR SURFACE - 38 |

| SURF | CONIC CONSTANT |
|---|---|
| 8 | −0.729057 |

| TILT AND DECENTER DATA | | | | (DEGREES) | | |
|---|---|---|---|---|---|---|
| SURF | TYPE | YD | XD | ALPHA | BETA | GAMMA |
| 2 | TILT | 0.00000 | 0.00000 | 42.0000 | 0.0000 | 0.0000 |
| 3 | TILT | 0.00000 | 0.00000 | −42.0000 | 0.0000 | 0.0000 |
| 5 | TILT | 0.00000 | 0.00000 | 42.0000 | 0.0000 | 0.0000 |
| 10 | TILT | 0.00000 | 0.00000 | −20.2488 | 0.0000 | 0.0000 |
| 11 | TILT | 0.00000 | 0.00000 | 20.2488 | 0.0000 | 0.0000 |
| 13 | TILT | −2.72112 | 0.00000 | 2.6951 | 0.0000 | 0.0000 |

Figure 3:
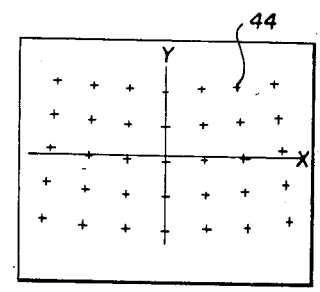
FIG. 3 is an image plane map of an orthogonal 20°×30° object field and which is helpful in understanding the invention.
Figure 4:
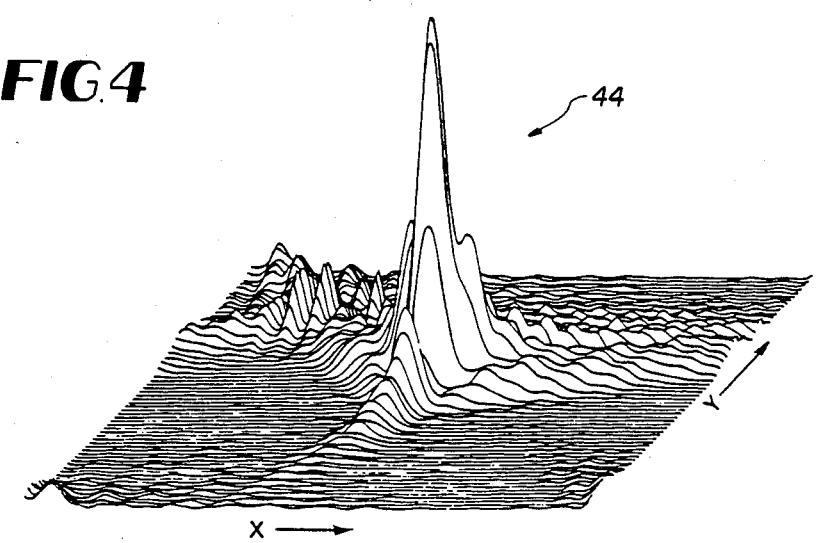
FIG. 4 is an isometric plot of diffraction intensity point spread function of a typical single object point imaged by the embodiment of the invention shown in FIG. 1.
Figure 5:
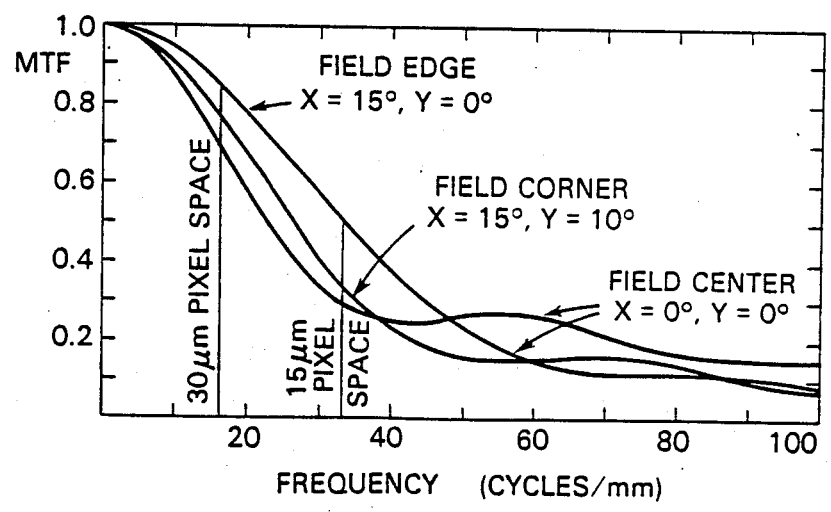
FIG. 5 is a graph illustrative of the geometrical modulation transfer functions of three object points imaged by the embodiment shown in FIG. 1.

The characteristics of an optical system as shown in FIGS. 1 and 2 and constructed in accordance with the design parameters of Table I are illustrated in FIGS. 3 through 5. With reference to FIG. 3, shown therein is a set of object points 44 at infinity mapped at the image plane of the detector 40 on either side of the origin of an orthogonal grid in the X-Y direction of the field of view. Although there is a noticeable barrel distortion and a slightly offset field center, this is readily acceptable in order to increase control over the other aberrations since the distortion can be reliably corrected following detection with automatic image data processing. The important feature with the subject invention is that being an all reflective system, there is no chromatic aberration. The remaining aberrations determine the system limiting angular resolution, generally dominating the diffraction effective in visible or shorter wavelengths. This is furthermore disclosed in FIG. 4 which is illustrative of the diffraction point spread function of one of the points as shown in FIG. 3 near a field corner where the route mean square (rms) spot size is substantially typical of values throughout the image field. Calculated geometrical modulation transfer functions for the center and edge and a corner of the field furthermore are shown in FIG. 5 where the spatial frequencies corresponding to two different detector pixel spacings are indicated. FIG. 5, moreover, effectively comprises a Fourier transform of FIG. 4.

Thus what has been shown and described is a wide-angle all-reflective unobscured optical imaging system for imaging distance scenes and being particularly useful for space astronomy and earth survey applications from orbit. It can also be used as a spectograph camera. The system furthermore is capable of providing effective focal lengths between 20 and 100 millimeters with focal ratios ranging from f/4 down to f/22.

Having shown and described what is at present considered to be the preferred embodiment of the invention, it should be noted that the same has been made by way of illustration and not limitation. Accordingly, all modifications, alterations and changes coming within the spirit and scope of the invention as defined in the appended claims are herein meant to be included.

We claim:

1. An all-reflective wide-angle unvignetted flat-field telescopic imaging system, comprising:
   baffle means for defining a predetermined relatively wide-angled field of view;
   primary mirror means comprising a segment of a first spherical mirror and having a convex spherical reflecting surface positioned relative to said baffle means to receive and reflect input light beams received from a remote source;
   secondary mirror means comprising a segment of an ellipsoidal mirror having a concave ellipsoidal reflecting surface positioned relative to said primary mirror means to receive and reflect light beams from said convex spherical reflecting surface of said first spherical mirror;
   tertiary mirror means comprising a segment of a second spherical mirror and being positioned relative to said secondary mirror means to receive light from said concave ellipsoidal reflecting surface thereof and reflect said light beams to a planar focal surface;
   aperture stop means located intermediate said secondary and tertiary mirror means;
   said segments of said primary, secondary and tertiary mirror means being positioned offset from a common optical axis in a first direction and in alignment therewith in a second direction, and wherein the centers of said first and second spherical mirrors, the foci of said ellipsoidal mirror and the center of said aperture stop means are substantially coincident with said optical axis, whereby said light beams pass through the system unobscured by any of said mirror segments; and
   light detector means being positioned in front of the concave spherical reflecting surface of said tertiary mirror means at the location of said planar focal surface and clear of light being received by said tertiary mirror means from said secondary mirror means.

2. The system as defined by claim 1 wherein said aperture stop means is located at the light beam waist region of light beams traversing from said secondary mirror means to said tertiary mirror means.

3. The system as defined by claim 2 wherein said aperture stop means comprises an adjustable iris type of diaphragm.

4. The system as defined by claim 1 wherein said baffle means comprises an elongated inwardly converging baffle having a generally rectangular cross section.

5. The system as defined by claim 4 wherein said baffle includes means for limiting the field of view to at least 20° in a first direction and at least 30° in a second mutually orthogonal direction relative to the first direction.

6. The system as defined by claim 5 wherein said first direction comprises a height or Y axis direction and said second direction comprises a width or X axis direction of said imaging system.

7. The system as defined by claim 4 wherein said baffle additionally includes interiorly located anti-reflective means.

8. The system as defined by claim 1 and additionally including a housing for supporting said baffle means and containing all said mirror means, said aperture stop means, and said detector means.

9. The system as defined by claim 8 wherein said housing comprises a light-tight housing.

10. The system as defined by claim 1 wherein said detector means includes a planar detector element at said planar focal surface.

11. The system as defined by claim 10 wherein said planar detector comprises a photoelectronic device.

12. The system as defined by claim 10 wherein said planar detector element comprises a television type imaging device.

13. The system as defined by claim 10 wherein said planar detector is selectively responsive to light beams over a portion of the electromagnetic spectrum ranging between the far ultraviolet and infrared regions thereof, including the visible region.

14. The system as defined by claim 13 and additionally including optical filter means located in the path of said light beams.

15. The system as defined by claim 13 and additionally including optical filter means positioned in front of said planar detector between said detector means and said tertiary mirror means.

16. The system as defined by claim 13 and additionally including optical filter means positioned behind said aperture stop means between said aperture stop means and said tertiary mirror means.

17. The system as defined by claim 1 wherein said detector means comprises photographic film.

* * * * *